United States Patent
Burr

(10) Patent No.: US 10,461,409 B1
(45) Date of Patent: Oct. 29, 2019

(54) POINTING SYSTEM IMPROVEMENT WITH IMAGING ARRAY FEEDS

(71) Applicant: Space Systems/Loral, LLC, Palo Alto, CA (US)

(72) Inventor: Douglas G. Burr, San Jose, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 28 days.

(21) Appl. No.: 15/831,257

(22) Filed: Dec. 4, 2017

(51) Int. Cl.
| | |
|---|---|
| H01Q 1/28 | (2006.01) |
| H04W 16/28 | (2009.01) |
| H01Q 3/36 | (2006.01) |
| H01Q 3/26 | (2006.01) |
| H01Q 21/22 | (2006.01) |
| H01Q 3/08 | (2006.01) |
| H01Q 19/10 | (2006.01) |
| H01Q 1/12 | (2006.01) |

(52) U.S. Cl.
CPC .......... H01Q 1/288 (2013.01); H01Q 3/2605 (2013.01); H01Q 3/36 (2013.01); H04W 16/28 (2013.01); H01Q 1/1264 (2013.01); H01Q 3/08 (2013.01); H01Q 3/267 (2013.01); H01Q 19/10 (2013.01); H01Q 21/22 (2013.01)

(58) Field of Classification Search
None
See application file for complete search history.

(56) References Cited

U.S. PATENT DOCUMENTS

| | | | |
|---|---|---|---|
| 5,587,714 A | 12/1996 | Chu et al. | |
| 5,949,370 A * | 9/1999 | Smith | H01Q 1/288 342/354 |
| 6,184,825 B1 * | 2/2001 | Wehner | H01Q 3/02 342/358 |
| 8,179,313 B1 * | 5/2012 | Azziz | H01Q 3/12 342/354 |
| 9,083,426 B1 | 7/2015 | Freedman et al. | |
| 9,153,877 B2 | 10/2015 | Burr | |
| 10,230,163 B2 * | 3/2019 | Adams | H01Q 3/02 |
| 2003/0222816 A1 | 12/2003 | Liu et al. | |
| 2004/0263393 A1 * | 12/2004 | Lynch | H01Q 9/0457 343/700 MS |
| 2008/0180314 A1 | 7/2008 | Lin | |

(Continued)

*Primary Examiner* — Howard Williams
(74) *Attorney, Agent, or Firm* — Weaver Austin Villeneuve & Sampson LLP

(57) ABSTRACT

A spacecraft includes an antenna reflector coupled with an antenna pointing mechanism (APM), a beam forming network including variable amplitude and phase (VAP) adjusting arrangements, a tracking feed that receives a beacon signal by way of the reflector, and an autotrack receiver that measures pointing errors of the reflector from the received beacon signal and outputs corresponding pointing errors to the APM controller and to a VAP element controller. The antenna reflector is illuminated by radiating feed elements configured as a phased array that produces, in a far field of the reflector, a set of user beams. The APM controller causes the APM to adjust the reflector pointing, at a frequency less than $f_1$, to reduce the measured pointing errors. The VAP element controller adjusts pointing of the user beams by adjusting beam forming coefficients of the VAP adjusting arrangements at a second frequency greater than $f_1$.

20 Claims, 6 Drawing Sheets

(56) References Cited

U.S. PATENT DOCUMENTS

2009/0315760 A1\* 12/2009 Mousavi Bafrooei .... G01S 3/42
                                                   342/174
2015/0295640 A1   10/2015 Burr
2016/0365629 A1   12/2016 Yao et al.
2018/0013204 A1   1/2018  Burr et al.

\* cited by examiner

POINTING SYSTEM IMPROVEMENT WITH IMAGING ARRAY FEEDS

TECHNICAL FIELD

The present disclosure relates generally to a spacecraft antenna system, and more to an improved RF autotracking system for a spacecraft antenna.

BACKGROUND OF THE INVENTION

The assignee of the present invention manufactures and deploys spacecraft for, inter alia, communications and broadcast services. Market demands for such spacecraft have imposed increasingly stringent requirements on spacecraft payloads. For example, broadband service providers desire spacecraft with increased data rate capacity at higher EIRP through each of an increased number of user spot beams operable from geosynchronous orbit altitudes in communication with small (<1 meter aperture) user terminals.

Techniques for meeting these demands are described in U.S. Pat. No. 9,153,877, entitled "HIGH EFFICIENCY MULTI-BEAM ANTENNA", U.S. Patent Publication No. 2015-0295640, entitled "BROADBAND SATELLITE PAYLOAD ARCHITECTURE", and U.S. patent application Ser. No. 15/438,620, entitled, "IMAGING ARRAY FED REFLECTOR", each assigned to the assignee of the present application, the disclosures of which are incorporated by reference herein in their entirety. Such techniques provide very narrow, high efficiency, spot beams with steep roll-off at the edge of coverage.

RF autotracking (RFAT) is a technique for steering antenna reflectors mounted to a spacecraft platform to compensate for pointing disturbances experienced by the vehicle and the antenna. U.S. Pat. No. 8,179,313, entitled "Antenna Tracking Profile Estimation" assigned to the assignee of the present invention, the disclosure of which is incorporated by reference herein in its entirety, describes an RFAT system.

Improved RFAT techniques are desirable, particularly for the contemplated antenna systems characterized as providing narrow spot beams with steep roll-off at the edge of coverage.

SUMMARY

The systems, methods and devices of this disclosure each have several innovative aspects, no single one of which is solely responsible for the desirable attributes disclosed herein.

According to some implementations, a spacecraft antenna system includes an antenna reflector mechanically coupled with an antenna pointing mechanism (APM), the APM configured to point the antenna reflector in response to commands from an APM controller, the antenna reflector illuminated by a plurality of radiating feed elements configured as a phased array configured to produce, in a far field of the reflector, a set of contiguous abutting user beams, a beam forming network (BFN) disposed proximate to the phased array, the BFN including a plurality of variable amplitude and phase (VAP) adjusting arrangements, at least one tracking feed configured to receive an uplink beacon signal from the ground by way of the antenna reflector, and an RF autotrack receiver configured to measure pointing errors of the antenna reflector from the received uplink beacon signal and output corresponding pointing error information to the APM controller and to a VAP element controller. The APM controller is configured to cause the APM to adjust the reflector pointing, at a frequency less than a first frequency, to reduce the measured pointing errors. The VAP element controller is configured to electronically adjust the pointing of the user beams by adjusting beam forming coefficients of one or more of the VAP adjusting arrangements at a second frequency greater than the first frequency.

In some examples, the VAP adjusting arrangements may be configured to electronically adjust the amplitude and phase of the plurality of feed elements so as to electrically steer the user beams.

In some examples, the first frequency may be not greater than 1 Hz and the second frequency may be greater than 1 Hz.

In some examples, the first frequency may be less than 0.2 Hz and the second frequency may be greater than 5 Hz.

In some examples, the APM controller may operate in a closed loop with the APM.

In some examples, the VAP element controller may operate in an open loop with the VAP adjusting arrangements of the BFN.

In some examples, each VAP adjusting arrangement may be implemented as a monolithic microwave integrated circuit (MMIC) VAP chip.

In some examples, each VAP chip may receive and implement the adjusting beam forming coefficients by adjusting the amplitude and phase of a respective feed element by way of a respective power amplifier.

According to some implementations, a spacecraft includes an antenna reflector mechanically coupled with an antenna pointing mechanism (APM), the APM configured to point the antenna reflector in response to commands from an APM controller, the antenna reflector illuminated by a plurality of radiating feed elements configured as a phased array configured to produce, in a far field of the reflector, a set of contiguous abutting user beams, a beam forming network (BFN) disposed proximate to the phased array, the BFN including a plurality of variable amplitude and phase (VAP) adjusting arrangements, at least one tracking feed configured to receive an uplink beacon signal from the ground by way of the antenna reflector, and an RF autotrack receiver configured to measure pointing errors of the antenna reflector from the received uplink beacon signal and output corresponding pointing error information to the APM controller and to a VAP element controller. The APM controller is configured to cause the APM to adjust the reflector pointing, at a frequency less than a first frequency, to reduce the measured pointing errors. The VAP element controller is configured to electronically adjust the pointing of the user beams by adjusting beam forming coefficients of one or more of the VAP adjusting arrangements at a second frequency greater than the first frequency.

According to some implementations, the VAP adjusting arrangements are configured to electronically adjust the amplitude and phase of the plurality of feed elements so as to electrically steer the user beams.

In some examples, the first frequency may be less than 0.2 Hz and the second frequency may be greater than 5 Hz.

In some examples, the APM controller may operate in a closed loop with the APM.

In some examples, the VAP element controller may operate in an open loop with the VAP adjusting arrangements of the BFN.

According to some implementations, a method includes adjusting a pointing of a spacecraft antenna system, with an antenna positioning mechanism (APM), at a frequency less than a first frequency, to reduce a measured pointing error, the antenna system including an antenna reflector illuminated by a plurality of radiating feed elements configured as a phased array configured to produce, in a far field of the reflector, a set of contiguous abutting user beams, and electronically adjusting the pointing of the user beams with a variable amplitude and phase (VAP) element controller by adjusting beam forming coefficients of one or more VAP adjusting arrangements at a second frequency greater than the first frequency. The antenna system includes an antenna reflector mechanically coupled with the APM, the APM being configured to point the antenna reflector in response to commands from an APM controller, the antenna reflector illuminated by a plurality of radiating feed elements configured as a phased array. A beam forming network (BFN) is disposed proximate to the phased array, the BFN including the one or more VAP adjusting arrangements. At least one tracking feed is configured to receive an uplink beacon signal from the ground by way of the antenna reflector. An RF autotrack receiver is configured to measure pointing errors of the antenna reflector from the received uplink beacon signal and output corresponding pointing error information to an APM controller that causes the APM to adjust the reflector pointing and to the VAP element controller.

In some examples, the VAP adjusting arrangements may be configured to electronically adjust the amplitude and phase of the plurality of feed elements so as to electrically steer the user beams.

In some examples, the first frequency may be not greater than 1 Hz and the second frequency may be greater than 1 Hz.

In some examples, the first frequency may be less than 0.2 Hz and the second frequency may be greater than 5 Hz.

In some examples, the APM controller may operate in a closed loop with the APM.

In some examples, the VAP element controller may operate in an open loop with the VAP adjusting arrangements of the BFN.

In some examples, each VAP chip may receive and implement the adjusting beam forming coefficients by adjusting the amplitude and phase of a respective feed element by way of a respective power amplifier.

Figure 1:
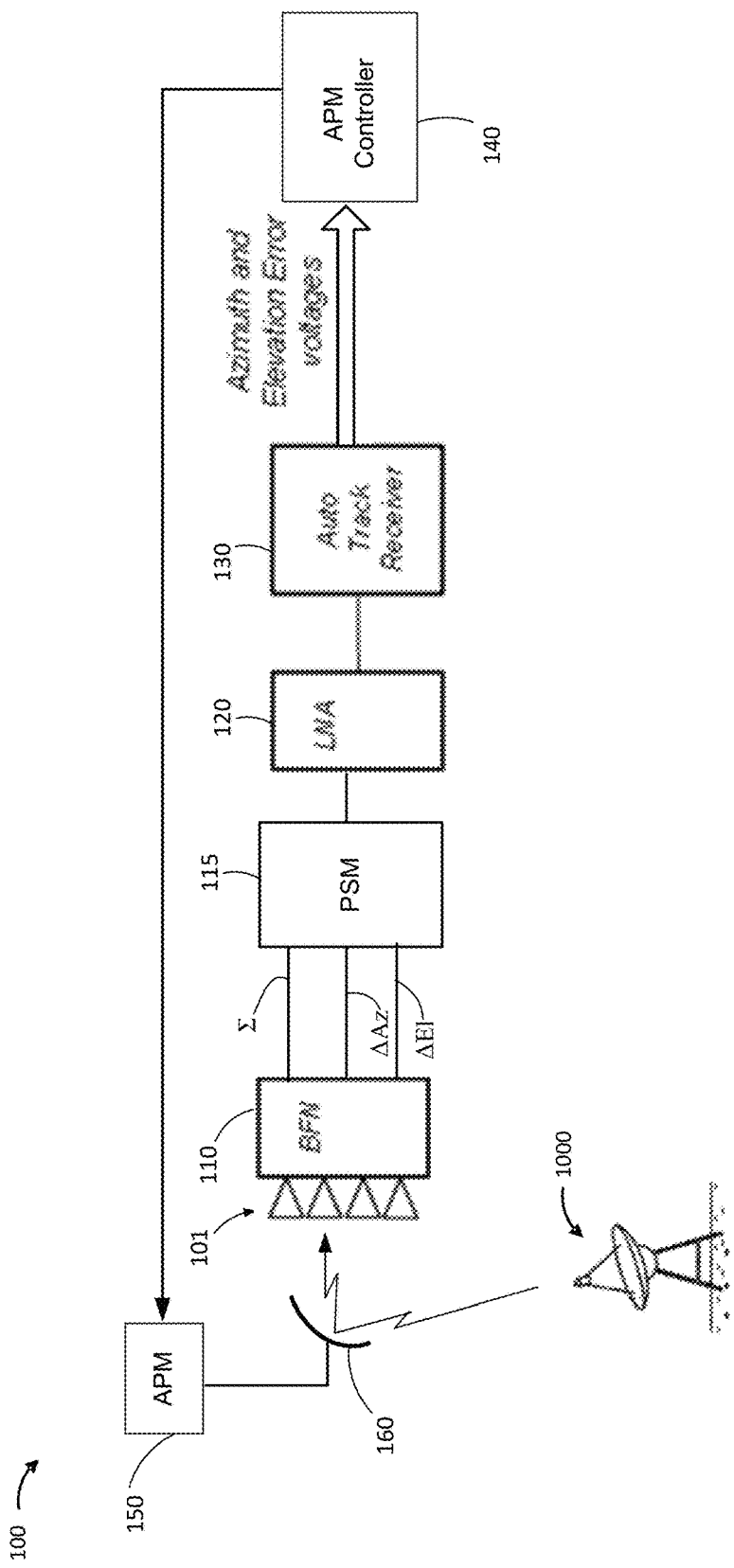
FIG. 1 illustrates a simplified block diagram of a closed loop, RF auto-tracked, mechanically actuated antenna pointing system for a spacecraft.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening features may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

A simplified block diagram of a closed loop, RF autotracked, mechanically actuated antenna pointing system for a spacecraft is illustrated in FIG. 1. The system 100 includes a tracking feeds 101 that may be included in or co-located with a fixed autotrack beam forming network (BFN) 110 and/or a plurality of radiating feed elements (not illustrated). The tracking feeds 101 may receive, by way of an antenna reflector 160, an uplink beacon signal from a ground station 1000 and forward an azimuth error beam, ΔAz, an elevation error beam, ΔEl, and a sum beam/to a pseudo monopulse modulator (PSM) 115. Outputs from the PSM 115 may be processed through a low noise amplifier 120 and provided to an autotrack receiver 130. The autotrack receiver 130 may be configured to detect pointing errors in azimuth and elevation created by bus attitude errors and/or reflector mispointing. Azimuth and elevation error voltages output from the autotrack receiver 130 may be used by an antenna positioning mechanism (APM) controller 140, in a closed loop manner. More particularly, the APM controller 140 may cause one or more stepper motors or other actuators in an APM 150 to mechanically adjust pointing of the antenna reflector 160 so as to reduce the pointing error voltages output from the tracking receiver toward zero.

The system 100 works well for slowly varying pointing disturbances such as diurnal thermal distortion of the reflector 160 or natural drift of the spacecraft from a desired orbital position and/or attitude. Faster disturbances, however, such as those caused by eclipse-induced fast thermal transients, thruster startup and associated reflector vibrations, for example, may be inadequately mitigated by the system 100. Although such higher frequency pointing disturbances may be accurately measured by the autotrack receiver 130, the actuators of APM 150 may be unable to correct for the pointing disturbances due to the inertia of the antenna reflector 160. Indeed, control loop filters or other techniques have been conventionally required to prevent the system 100 from attempting to correct for high frequency pointing disturbances, so as to avoid dithering or unstable operation of the actuators of the APM 150. In view of these concerns, the control loop illustrated in FIG. 1 is conventionally operated at a rate not greater than 1 Hz, more commonly less than 0.2 Hz.

The present inventor has appreciated that higher frequency pointing disturbances can be compensated for by electrically adjusting the pointing of antenna system user beams formed by an active phased array. Electrically adjusting the pointing may be executed in an open-loop manner to correct for high frequency and/or very fine errors that the mechanically actuated closed loop system described above, in connection with FIG. 1, may be unable to correct. More particularly, where the beam forming network for a user beam includes a plurality of commandable variable amplitude and phase (VAP) adjusting arrangements, beamforming coefficients of the VAP adjusting arrangements may be adjusted to compensate for high frequency and/or very fine reflector pointing disturbances.

Figure 2:
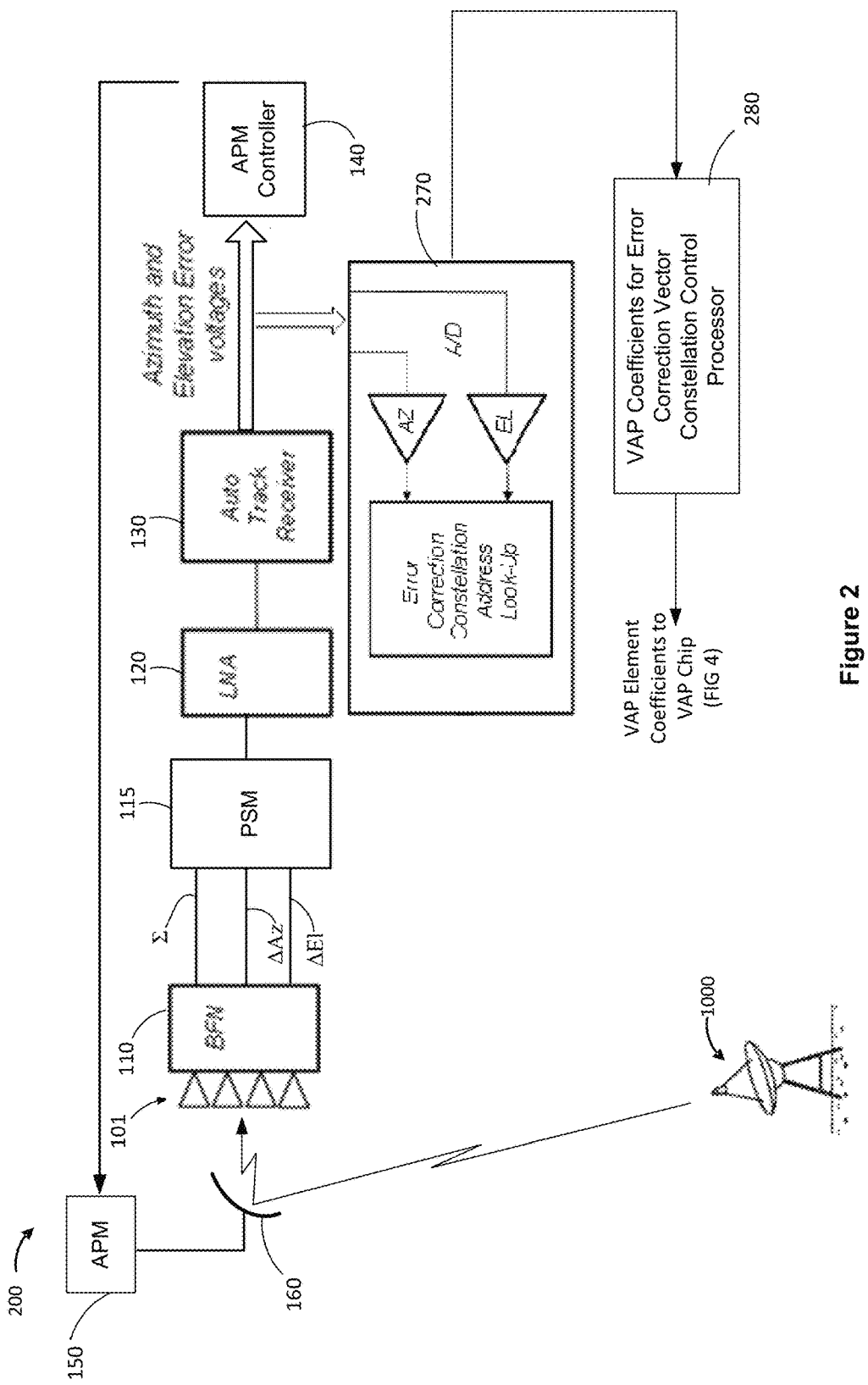
FIG. 2 illustrates a block diagram of an RF Autotracking system in accordance with an implementation.

FIG. 2 illustrates a block diagram of an RF Autotracking system in accordance with an implementation. The system 200 includes an open loop electronic pointing arrangement coupled with the above described closed loop, RF autotracked, mechanically actuated antenna pointing arrangement. The open loop electronic pointing arrangement may be configured to compensate for errors measured by the autotrack receiver 130 that the actuators of APM 150 are unable to correct.

The system 200 may include elements of the arrangement 100 described in connection with FIG. 1, including, for example, the tracking feeds 101, the fixed autotrack BFN 110, PSM 115, the LNA 120, the autotrack receiver 130, the APM controller 140, the APM 150 and the antenna reflector 160. In the illustrated implementation, azimuth and elevation error voltages output from auto track receiver 130 are also fed to a processor 270. The processor 270 may be configured to periodically calculate an imaging array pointing error correction instruction. In the illustrated implementation, the pointing error correction instruction is forwarded to VAP element control processors 280. The correction instruction may be updated periodically. Advantageously, the correction instruction may be updated at a rate greater than the APM 150 would ordinarily be able to move the reflector 160, taking into account the inertia of the antenna reflector 160. For example, the correction instructions may be updated at a rate greater than 1 Hz. Advantageously, the corrections may be made at a rate of 5-10 Hz, for example. Alternatively, or in addition, the correction instruction may be capable of correcting errors that are finer than the resolution of the APM 150. For example, the correction instruction may be capable of correcting errors that are finer than a step size of a stepper motor actuator of APM 150.

Figure 3:
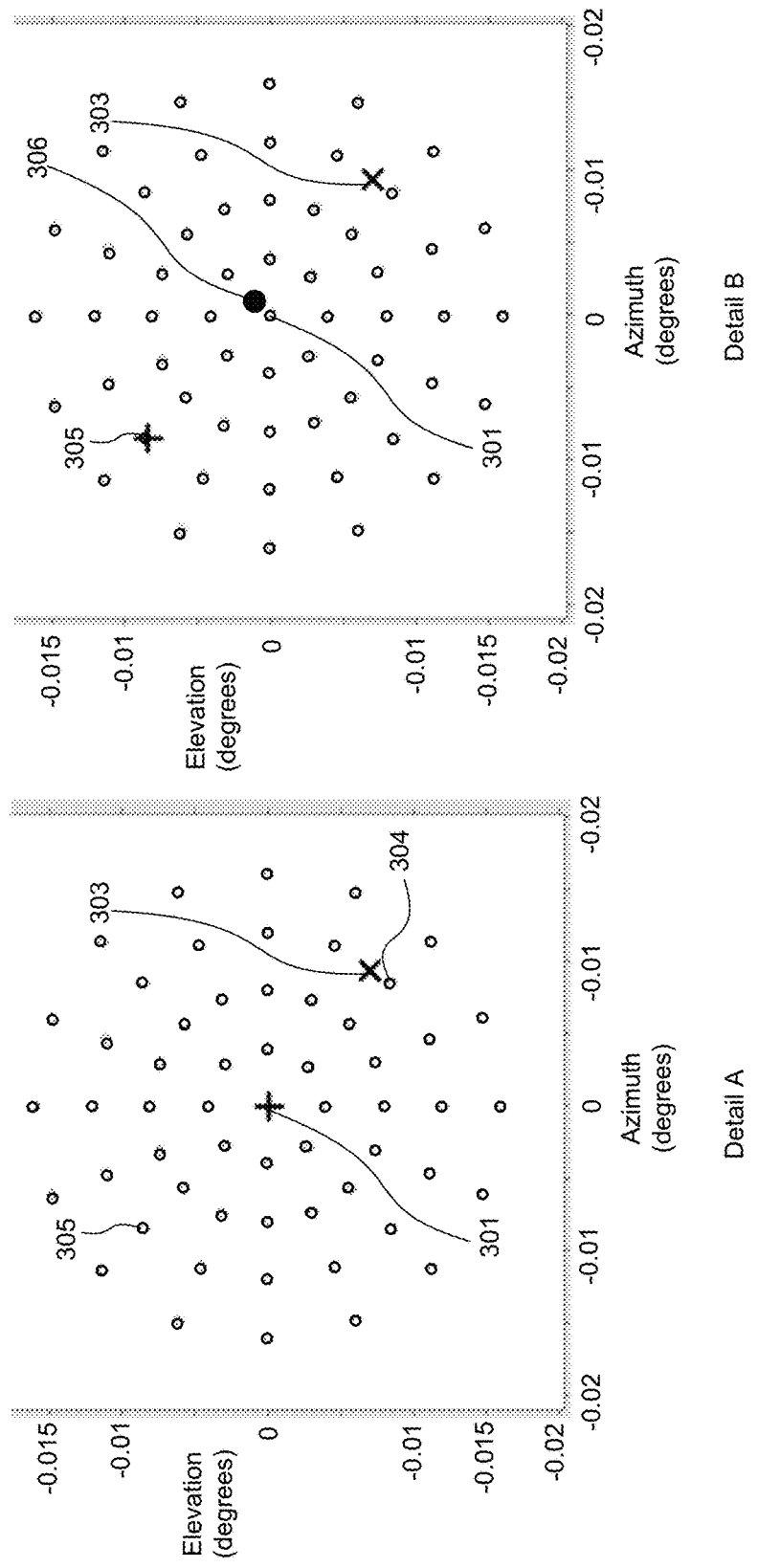
FIG. 3 illustrates an example of electrically steering a user beam, according to implementation.

The correction instruction may be determined by accessing a look up table that includes a set of VAP coefficients. The look up table may be configured to include pre-calculated sets of VAP coefficients, each set of VAP coefficients corresponding to a pre-defined error correction. In an implementation illustrated in FIG. 3, VAP coefficients corresponding to 57 pre-defined error correction points (including zero error, point 301) are depicted, but a greater or lesser number may be contemplated. Referring first to Detail A, in the absence of a measured error, or where the measured azimuth and elevation error is zero, VAP coefficients corresponding to point 301 may be selected and a user beam center may be aligned with point 301. In the illustrated example, however, a measured azimuth and elevation error indicates that the measured beam center location corresponds to location 303. The processor 270 may be configured to determine which of the pre-defined error correction points is closest to the location 303. In the illustrated example, the closest pre-defined error correction point is point 304. The VAP coefficients corresponding to point 304 may be pre-determined to electrically steer the beam in a direction and by a magnitude corresponding to a vector extending from point 304 to point 301. Referring now to Detail B, as a result of applying the VAP coefficients corresponding to point 304, the beam may be electronically steered such that the beam center, in the absence of pointing disturbances would be directed toward point 305. In the presence of the measured pointing disturbances, however, the beam center is directed toward point 306, a result that is less than 0.005° from the desired point 301.

The control processors 280 may be configured to reside on read only memory (ROM) devices disposed proximate to respective VAP adjusting arrangements that are included in a beam forming network of a user beam (user beam BFN).

Figure 4:
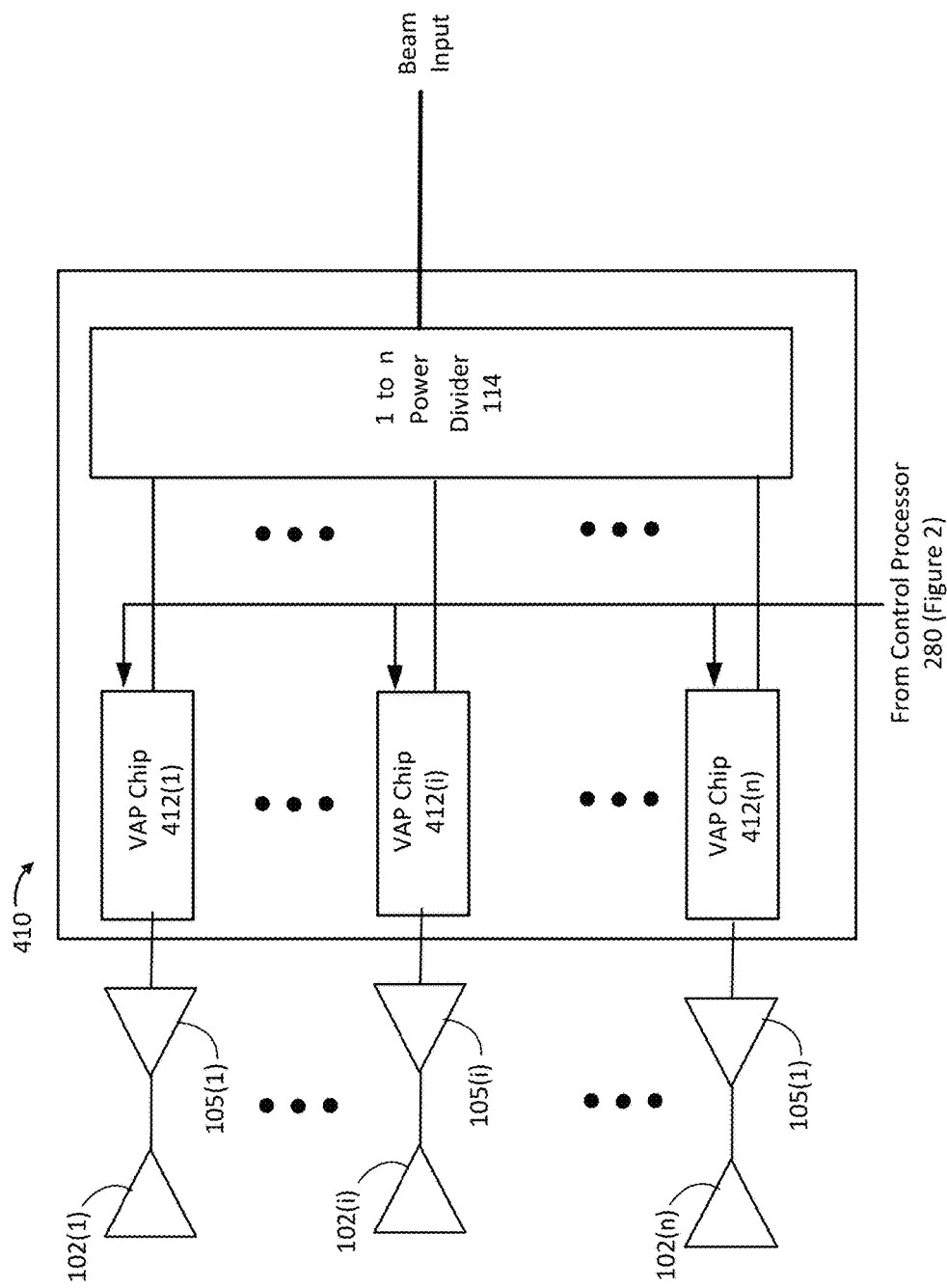
FIG. 4 illustrates features of a beam forming network and phased array for a user beam, according to an implementation.

The control processors 280 may forward VAP coefficients to the user beam BFN. More particularly, referring now to FIG. 4, each feed element power amplifier in the user beam BFN 410 may include or be associated with a VAP adjusting arrangement implemented as a monolithic microwave integrated circuit (MMIC) VAP chip 412. The user beam BFN 410, in the illustrated implementation, is configured to perform n-element beam forming. The user beam BFN 410 includes 1:n power divider 114, and commandable VAP adjusting arrangements 412. Each of the n VAP chips 412 may be communicatively coupled with a respective, single power amplifier 105, which is communicatively coupled with a single corresponding feed element 102. Each VAP chip 112(*i*) may receive and implement the VAP coefficients, received from a control processor 280, by adjusting the amplitude and phase of the respective feed element 102(*i*) by way of the respective power amplifier 105(*i*).

In an example implementation, a feed element 102 and the reflector 160 may be sized to produce a beamlet of about 0.1 degree in the 20 GHz band. Adjacent radiating elements 102 will produce adjacent beamlets in the far-field at a spacing determined by the element spacing and the focal length of the reflector. In the example implementation, the beamlet spacing will be about 0.07 degrees. Because the beamlet spacing is less than the beamlet width, clusters of overlapping beamlets will efficiently combine in the far-field to produce a shaped antenna pattern, larger than any individual beamlet, which is an image of the phased array. Accordingly, the phased array may be referred to as an "imaging array" of which the beamlets may be regarded as pixels that produce the image.

Figure 5:
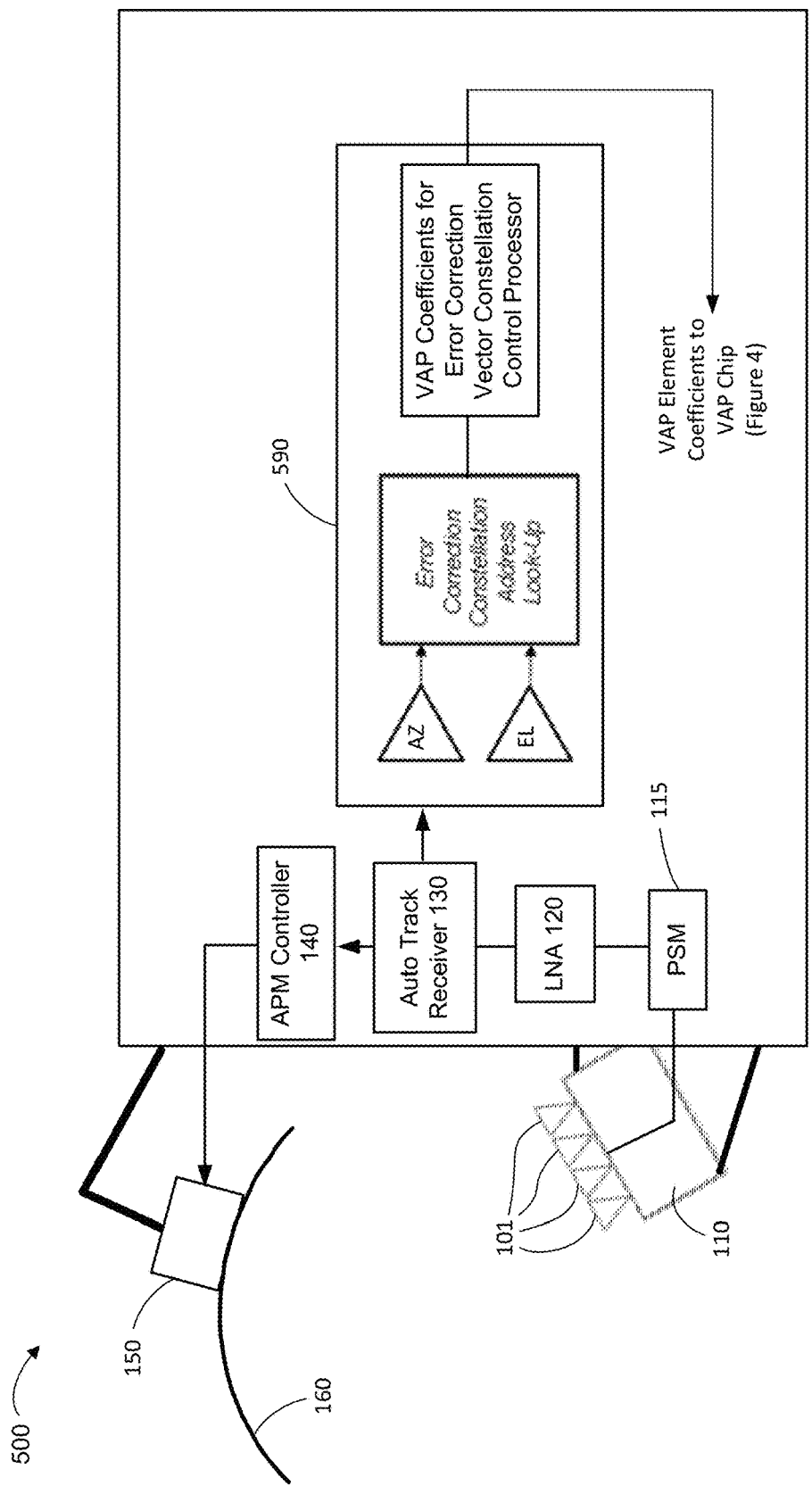
FIG. 5 illustrates an example block diagram of a spacecraft according to an implementation.

Referring now to FIG. 5, an example block diagram of a spacecraft 500 according to an implementation is illustrated. In the illustrated example, the spacecraft 500 includes the antenna reflector 160 mechanically coupled with the APM 150. The APM 150 may be configured to point the antenna reflector 160 in response to commands from the APM controller 140. A plurality of tracking feed elements 101 configured as a phased array may be illuminated by the antenna reflector 160. The BFN 110 may be disposed proximate to the phased array. The tracking feeds 101 may be configured to receive an uplink beacon signal from a ground station (not illustrated) by way of the antenna reflector 160. The RF autotrack receiver 130 may be configured to measure azimuth (AZ) and elevation (EL) pointing errors of the antenna reflector 160 from the received uplink beacon signal. The RF autotrack receiver 130 may be configured to output corresponding pointing error information to the APM controller 140 and to a VAP element controller 590.

The APM controller 140 may be configured to cause the APM 150 to adjust the pointing of the reflector 160, at a frequency less than a first frequency, to reduce the measured pointing errors. The VAP element controller 590 may be configured to electronically adjust the pointing of the antenna system by adjusting beam forming coefficients of one or more of the VAP adjusting arrangements at a second frequency greater than the first frequency. In some implementations, the first frequency is not greater than 1 Hz and the second frequency is greater than 1 Hz. Advantageously, the first frequency may be less than 0.2 Hz and the second frequency may be greater than 5 Hz.

Figure 6:
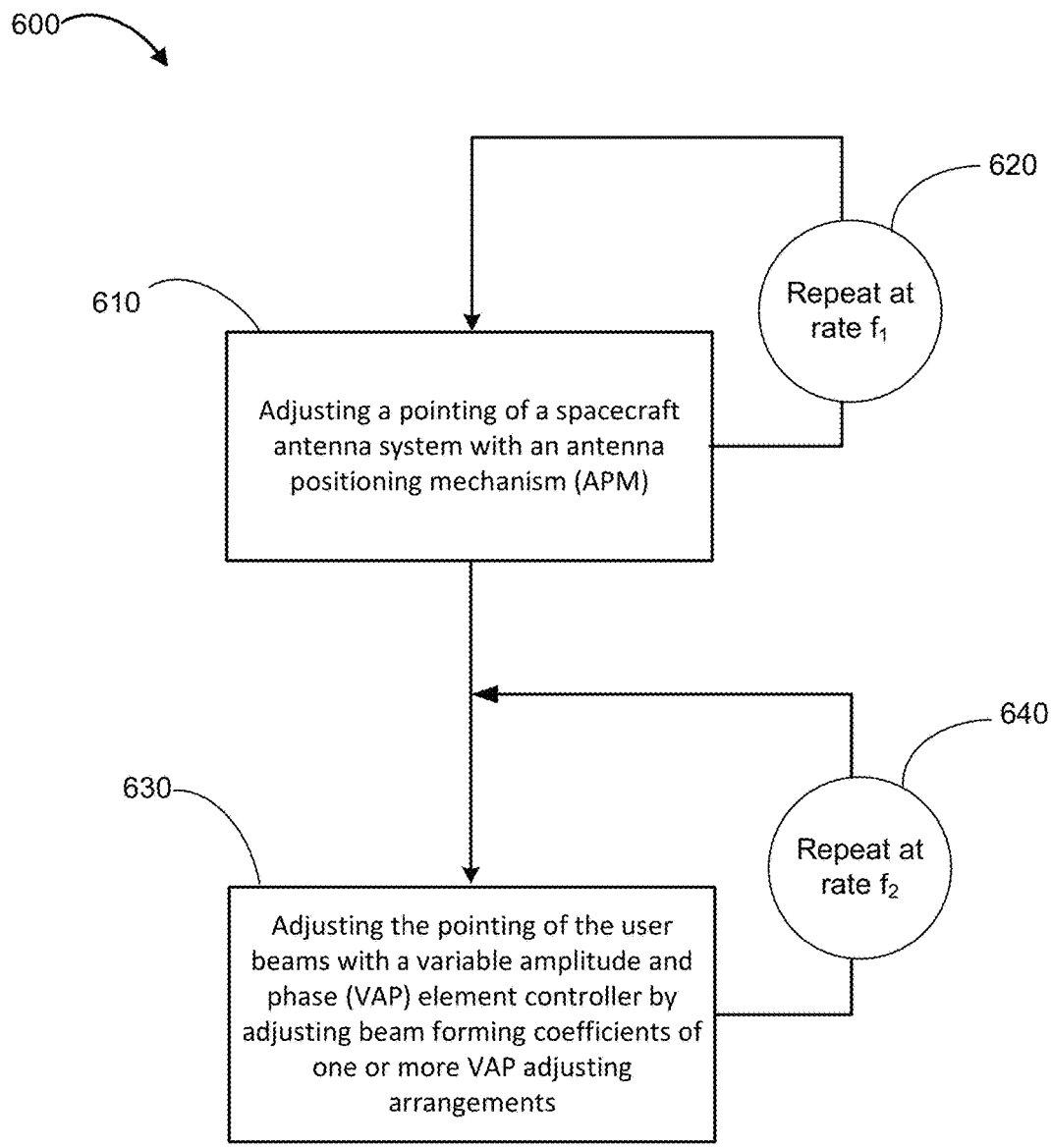
FIG. 6 illustrates a method for RF autotracking a spacecraft antenna system according to an implementation.

Referring now to FIG. 6, a method 600 for RF autotracking a spacecraft antenna system is illustrated. At block 610, pointing of the spacecraft antenna system is adjusted with an antenna positioning mechanism (APM). The pointing adjustment may be repeated, block 620 at a frequency $f_1$.

At block 630, the pointing of the user beams is electronically adjusted with a variable amplitude and phase (VAP) element controller by adjusting beam forming coefficients of one or more VAP adjusting arrangements. The electronic adjustment may be repeated, block 640 at a frequency $f_2$. The frequency $f_2$, advantageously, may be larger than the frequency $f_1$.

As described above, the antenna system may include an antenna reflector mechanically coupled with the APM, the APM being configured to point the antenna reflector in response to commands from an APM controller, the antenna reflector being illuminated by a plurality of radiating feed elements configured as phased arrays. A BFN may be disposed proximate to the phased array, the BFN including the one or more VAP adjusting arrangements. A pseudomonopulse feed array or element may be configured to receive an uplink beacon signal from the ground by way of the antenna reflector. An RF autotrack receiver may be configured to measure pointing errors of the antenna reflector from the received uplink beacon signal and output corresponding pointing error information to an APM controller that causes the APM to adjust the reflector pointing and to the VAP element controller.

It will be appreciated that, in the implementations disclosed above, a relatively slow, relatively coarse, error correction performed by the APM may be controlled in a closed loop manner. More particularly, the APM controller 140 measures error outputs of the autotrack receiver 130 and may drive the APM 140 so as to articulate the reflector 160 in a manner that reduces the errors toward zero.

A relatively fast, relatively fine, error correction performed by the VAP element controller 590, for example, may be controlled in an open loop manner. More particularly, in some implementations, VAP element controller 590 measures the error outputs of the autotrack receiver 130 and may determine the best available error correction coefficients that will compensate for the measured error by electrically steering the beam. The open loop control does not cause the reflector to move, and thus does not reduce the measured error, but, rather, compensates for that error by electrically steering the user beams.

Thus, an improved RF autotracking system has been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft antenna system comprising:
an antenna reflector mechanically coupled with an antenna pointing mechanism (APM), the APM configured to point the antenna reflector in response to commands from an APM controller, the antenna reflector illuminated by a plurality of radiating feed elements configured as a phased array configured to produce, in a far field of the reflector, a set of contiguous abutting user beams;
a beam forming network (BFN) disposed proximate to the phased array, the BFN including a plurality of variable amplitude and phase (VAP) adjusting arrangements;
at least one tracking feed configured to receive an uplink beacon signal from the ground by way of the antenna reflector; and
an RF autotrack receiver configured to measure pointing errors of the antenna reflector from the received uplink beacon signal and output corresponding pointing error information to the APM controller and to a VAP element controller; wherein
the APM controller is configured to use the outputted pointing error information to reduce the measured pointing errors by causing the APM to adjust the reflector pointing, at a frequency less than a first frequency; and
the VAP element controller is configured use the outputted pointing error information to electronically adjust the pointing of the user beams by adjusting beam forming coefficients of one or more of the VAP adjusting arrangements at a second frequency greater than the first frequency.

2. The antenna system of claim 1, wherein the VAP adjusting arrangements are configured to electronically adjust the amplitude and phase of the plurality of feed elements so as to electrically steer the user beams.

3. The antenna system of claim 1, wherein the first frequency is not greater than 1 Hz and the second frequency is greater than 1 Hz.

4. The antenna system of claim 1, wherein the first frequency is less than 0.2 Hz and the second frequency is greater than 5 Hz.

5. The antenna system of claim 1, wherein the APM controller operates in a closed loop with the APM.

6. The antenna system of claim 1, wherein the VAP element controller operates in an open loop with the VAP adjusting arrangements of the BFN.

7. The antenna system of claim 1, wherein each VAP adjusting arrangement is implemented as a monolithic microwave integrated circuit (MMIC) VAP chip.

8. The antenna system of claim 1, wherein each VAP chip receives and implements the adjusting beam forming coefficients by adjusting the amplitude and phase of a respective feed element by way of a respective power amplifier.

9. A spacecraft comprising:
an antenna reflector mechanically coupled with an antenna pointing mechanism (APM), the APM configured to point the antenna reflector in response to commands from an APM controller, the antenna reflector illuminated by a plurality of radiating feed elements configured as a phased array configured to produce, in a far field of the reflector, a set of contiguous abutting user beams;

a beam forming network (BFN) disposed proximate to the phased array, the BFN including a plurality of variable amplitude and phase (VAP) adjusting arrangements;

at least one tracking feed configured to receive an uplink beacon signal from the ground by way of the antenna reflector; and an RF autotrack receiver configured to measure pointing errors of the antenna reflector from the received uplink beacon signal and output corresponding pointing error information to the APM controller and to a VAP element controller; wherein the APM controller is configured to use the outputted pointing error information to reduce the measured pointing errors by causing the APM to adjust the reflector pointing, at a frequency less than a first frequency; and the VAP element controller is configured to use the outputted pointing error information electronically adjust the pointing of the user beams by adjusting beam forming coefficients of one or more of the VAP adjusting arrangements at a second frequency greater than the first frequency.

10. The spacecraft of claim 9, wherein the VAP adjusting arrangements are configured to electronically adjust the amplitude and phase of the plurality of feed elements so as to electrically steer the user beams.

11. The spacecraft of claim 9, wherein the first frequency is less than 0.2 Hz and the second frequency is greater than 5 Hz.

12. The spacecraft of claim 9, wherein the APM controller operates in a closed loop with the APM.

13. The spacecraft of claim 9, wherein the VAP element controller operates in an open loop with the VAP adjusting arrangements of the BFN.

14. A method comprising:

receiving an uplink beacon signal from the ground by way of an antenna reflector mechanically coupled with an antenna pointing mechanism (APM), the APM configured to point the antenna reflector in response to commands from an APM controller, the antenna reflector illuminated by a plurality of radiating feed elements configured as a phased array configured to produce, in a far field of the reflector, a set of contiguous abutting user beams, a beam forming network (BFN) disposed proximate to the phased array, the BFN including a plurality of variable amplitude and phase (VAP) adjusting arrangements;

receiving, with at least one tracking feed, an uplink beacon signal from the ground by way of the antenna reflector;

measuring, with an RF autotrack receiver, from the received uplink beacon signal, pointing errors of the antenna reflector and outputting corresponding pointing error information to the APM controller and to a variable amplitude and phase (VAP) element controller;

reducing the measured pointing errors by the APM controller causing the APM to adjust the reflector pointing at a frequency less than a first frequency in response to the outputted pointing error information;

electronically adjusting the pointing of the user beams with the VAP element controller, in response to the outputted pointing error information, by adjusting beam forming coefficients of one or more VAP adjusting arrangements at a second frequency greater than the first frequency.

15. The method of claim 14, wherein the VAP adjusting arrangements are configured to electronically adjust the amplitude and phase of the plurality of feed elements so as to electrically steer the user beams.

16. The method of claim 14, wherein the first frequency is not greater than 1 Hz and the second frequency is greater than 1 Hz.

17. The method of claim 14, wherein the first frequency is less than 0.2 Hz and the second frequency is greater than 5 Hz.

18. The method of claim 14, wherein the APM controller operates in a closed loop with the APM.

19. The method of claim 14, wherein the VAP element controller operates in an open loop with the VAP adjusting arrangements of the BFN.

20. The method of claim 14, wherein each VAP chip receives and implements the adjusting beam forming coefficients by adjusting the amplitude and phase of a respective feed element by way of a respective power amplifier.

* * * * *